July 17, 1934.  V. I. ZELOV  1,966,841
PRESSURE TRANSFORMER
Filed March 26, 1931  3 Sheets-Sheet 1
FIG. 1
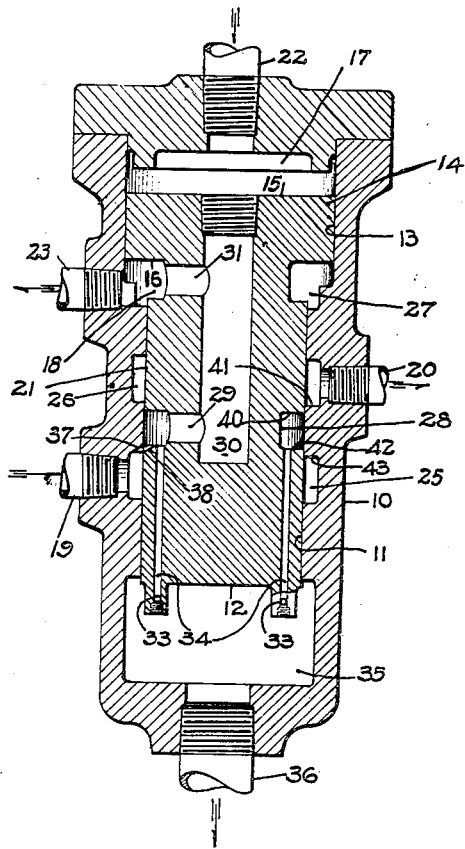
FIG. 3.
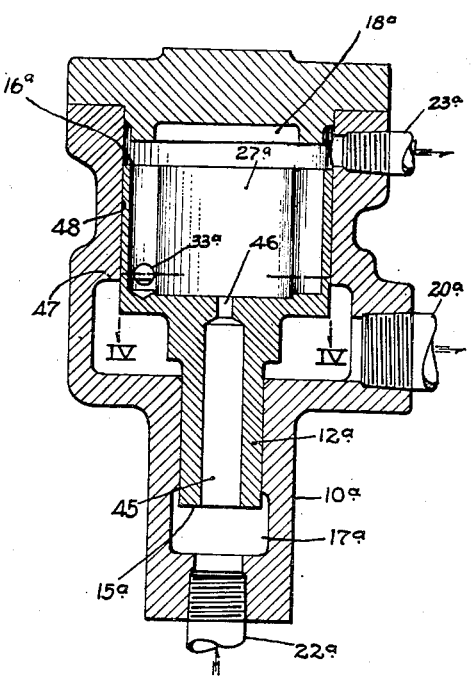
FIG. 4.
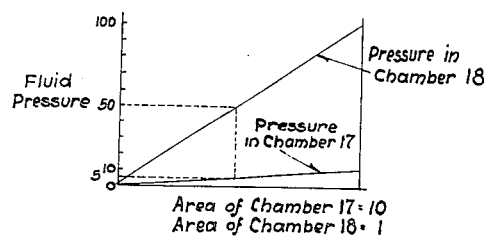
FIG. 2.
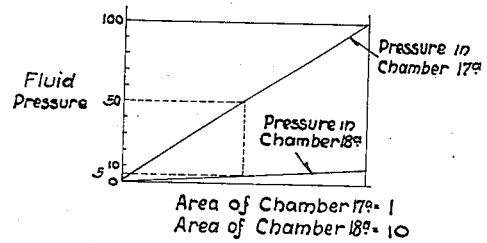
FIG. 5.
WITNESS
INVENTOR
Victor I. Zelov.
BY
ATTORNEY July 17, 1934.  V. I. ZELOV  1,966,841

PRESSURE TRANSFORMER

Filed March 26, 1931  3 Sheets-Sheet 2

INVENTOR
Victor I. Zelov.
BY
ATTORNEY

July 17, 1934.  V. I. ZELOV  1,966,841
PRESSURE TRANSFORMER
Filed March 26, 1931  3 Sheets-Sheet 3

INVENTOR
Victor I. Zelov.
BY
ATTORNEY

Patented July 17, 1934

1,966,841

UNITED STATES PATENT OFFICE 1,966,841

PRESSURE TRANSFORMER

Victor I. Zelov, Rosemont, Pa.

Application March 26, 1931, Serial No. 525,584

27 Claims. (Cl. 137—153)

My invention relates to pressure transformation apparatus and it has for an object to provide means of this character responsive to changes in actuating, primary or controlling pressure to obtain desired changes in transformed or secondary pressure, the latter being utilized for any suitable purpose.

My improved transformer includes a piston member or construction which is movable in response to changes in actuating or primary pressure to secure proportionate changes in transformed or secondary pressure. The primary and secondary pressures may incease or decrease together or the inverse relation may hold. A large change in primary pressure may result in a small change in secondary pressure and vice versa whether the primary and secondary pressures vary directly or inversely. Relative variations of primary and secondary pressures in these various ways provide for use of the transformer in satisfying various needs; and variation in type is brought about by providing varying piston areas, by providing primary and secondary piston faces disposed in opposed or like directions, the piston faces being opposed by a spring if disposed in like directions, and by providing for controlled escape or exhaust of pressure medium from the secondary side of the apparatus. In all forms of my invention, I provide a housing with a piston member therein and defining with respect thereto primary and secondary chambers; the secondary chamber has pressure supply and exhaust passages, communication between the secondary chamber and the exhaust passage being dependent upon the axial position of the piston member and the latter being dependent upon primary and secondary pressures applied to the primary and secondary piston faces or pressure abutments; and the housing is provided with a passage for supplying medium under primary pressure to the primary chamber and with a passage for supplying medium under secondary pressure from the secondary chamber to a desired point of use. A further object of my invention is to provide apparatus having these advantageous features of construction and operation.

A further object of my invention is to provide a pressure transformer having a piston member with means for maintaining motion of the piston member to overcome static friction.

A further object of my invention is to provide a pressure transformer having a piston construction which moves in response to changes in primary pressure to secure desired changes iin secondary pressure.

A further object of my invention is to provide a pressure transformer embodying a piston having jet means for spinning it to overcome static friction.

A further object of my invention is to provide pressure transformation apparatus which gives changes in secondary pressure dependent upon changes in primary pressure with means for producing periodic secondary pressure pulsations in order to secure small movements of moving parts of the apparatus to overcome static friction.

These and other objects are effected by my invention as will be apparent from the following description and claims taken in connection with the accompanying drawings, in which:

Fig. 1 is a vertical sectional view showing an embodiment of my invention for securing a large change in secondary pressure for a small primary pressure change;

Fig. 2 is a pressure diagram for the apparatus of Fig. 1;

Fig. 3 is a sectional view of a second embodiment where large changes in primary pressure occur with small changes in secondary pressure;

Fig. 4 is a sectional view of the piston construction of Fig. 3 and taken along the line IV—IV of the latter;

Fig. 5 is a pressure diagram for Fig. 4;

Fig. 10 is a sectional view taken along the line X—X of Fig. 9 and viewed in the direction of the arrows;

Figure 6:
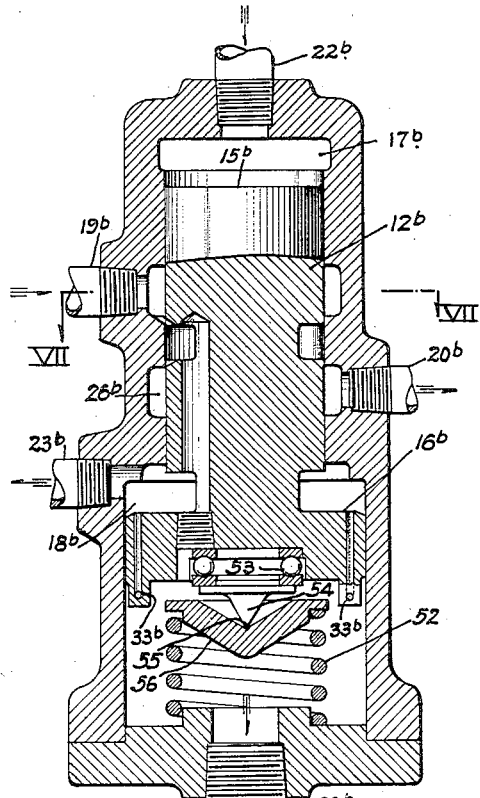
Fig. 6 is a sectional view of a third embodiment where the pressure relations are inversely related and small changes in primary pressure result in large secondary pressure changes.

My invention may be used in various situations where it is desired to secure pressure transformations. For example, in Fig. 14, the transformer is arranged between a high-pressure boiler and a gage so that changes in primary or high pressure result in proportionate low-pressure changes permitting of the use of a sensitive gage to indicate changes in pressure in the high-pressure boiler. The invention is susceptible of various other applications such as relays and the like, the piston areas and relations being modified to suit the particular requirements.

Referring to Fig. 1, I show a transformer housing 10 having a bore or chamber 11 within which is disposed the piston member or construction 12. The bore is enlarged at 13 for the enlarged portion 14 of the piston member, the enlarged portion being provided with piston faces or pressure abutments 15 and 16 defining with the housing primary and secondary pressure chambers 17 and 18, respectively. Pressure supply and exhaust passages 19 and 20 are provided for the secondary chamber 18 and the piston member 12 has a piston valve portion 21 controlling communication between the secondary chamber and these passages. Medium under primary pressure is supplied to the primary chamber 17 by the passage 22, and medium under secondary pressure is supplied from the secondary chamber 18 to a desired point of use by the passage 23.

The pressure supply passage 19, the exhaust passage 20 and the secondary pressure supply passage 23 communicate with annular recesses or grooves 25, 26 and 27, respectively, the recess or groove 27 opening into the secondary pressure chamber 18 and the exhaust recess or groove 26 being disposed between the pressure supply recess or groove 25 and the secondary pressure groove 27. The piston valve portion 21 is provided with an annular groove 28 disposed between and adapted to communicate either with the pressure supply groove 25 or the exhaust groove 26, the groove 28 communicating with the secondary pressure chamber by connecting passages 29, 30 and 31 formed in the piston valve portion 21.

In the embodiment shown in Fig. 1, the primary piston face or pressure abutment 15 is larger than the secondary piston face or pressure abutment 16, for example, as indicated in Fig. 2, it may be ten times as large. Therefore, if a change in primary or actuating pressure in the primary chamber 17 takes place, a larger secondary pressure change takes place, the primary and secondary pressures being proportionate to the secondary and primary piston areas. If the pressure of medium supplied by the primary passage 22 to the primary pressure chamber 17 increases, the primary pressure acting on the primary piston face 15 overbalances the secondary pressure acting on the secondary piston face and the piston member moves down to open up communication between the pressure supply 19 and the secondary chamber 18, thereby bringing about increasing secondary pressure which will continue until the product of the secondary pressure times the area of the piston face 16 is again in equilibrium with the product of the primary pressure times the area of the piston face 15. If the primary pressure decreases, the piston member moves up placing the secondary pressure chamber 18 in communication with the exhaust passage 20 to lower the secondary pressure until an equilibrium condition is again effected. When the piston forces are balanced, the piston valve 21 occupies a neutral or cut-off position, as shown in Fig. 1.

In order to increase the sensitivity or responsiveness of apparatus of the character described, it is desirable that the piston member 12 be maintained in motion to avoid static friction. Hence, I show the lower end of the piston member provided with tangential jets 33 effective, due to velocity of medium issuing therefrom, to spin the valve or piston member about its longitudinal axis. The jets are preferably supplied with medium from the secondary pressure side of the apparatus, for example, I show passages 34 supplying the jets and connected to the groove 28. The jets 33 discharge into the exhaust chamber 35 connected to the exhaust passage 36.

I also provide for periodic secondary pressure pulsations which are effective, not only in avoiding static friction of the piston member 12, but in avoiding static friction of moving part or parts actuated by the secondary pressure. To this end, the pressure supply annular recess or groove 25 is provided with a notch 37 at its upper side adapted to register with a notch 38 formed in the lower side of the piston groove 28 to supply pressure medium from the supply passage 19 to the secondary chamber 18 and the secondary supply passage 23. Any desired number of notch registrations may be effected for each turn of the valve member 12, each registration resulting in a secondary pressure pulsation for the purposes stated. As the piston member spins on account of the reaction jets 33, the period of registration is quite brief with the result each pulsation takes place with very little flow, and, therefore, disturbance of the secondary pressure on this account is negligible. The upper side of the piston groove 28 is provided with an edge 40 which laps the edge 41 of the exhaust groove 26 and the lower side of the groove 28 is provided with an edge 42 which laps the upper edge 43 of the pressure supply groove 25 when the piston member is in neutral or cut-off position. The notches 37 and 38, already referred to, are provided in the edges 42 and 43.

The form of my invention shown in Fig. 1 is useful in any situation where proportionate magnification of controlling pressure change is desired, for example, in a relay where small changes in controlling or primary pressure are used to obtain proportionately greater secondary pressure changes.

In the embodiment shown in Fig. 3, the housing 10a encloses the piston member 12a, and the primary pressure face or abutment 15a is smaller than the face or abutment 16a with the result that a large pressure change in the primary pressure chamber 17a is accompanied by a small change in pressure in the secondary pressure chamber 18a, the pressures being in inverse ratio to the piston faces or abutments. In this form, medium under primary pressure is supplied to the primary pressure chamber by the passage 22a, and pressure supply and exhaust passages are provided for the secondary pressure chamber 18a; however, the latter pressure supply is derived from the primary supply and the exhaust has been combined with the reaction jet means for turning the piston member. More particularly, the piston member 12a is provided with a passage 45 for supplying medium from the primary pressure chamber 17a, through an orifice 46, to the secondary pressure chamber 18a; and the reaction jets 33a are larger in cross-section than those of Fig. 1 and are arranged to be lapped more or less by the lower edge 47 of the secondary piston bore 48 to vary the extent of exhaust from the secondary pressure chamber. With the piston member in equilibrium position, the primary and secondary pressures are in inverse relation to the primary and secondary piston or abutment areas, the reaction jet requirements being met by flow through the orifice. If there is an increase in primary pressure, the piston member 12a moves up, restricting the exhaust area of the reaction jets 33a, and consequently increasing the secondary pressure until the change in the latter times the area of the secondary piston face balances the primary change times the area of the primary piston face. If the primary pressure decreases, the exhaust area of the jets 33a increases on account of downward movement of the piston member, and the piston member moves until an equilibrium condition is reached, as before.

Figure 14:
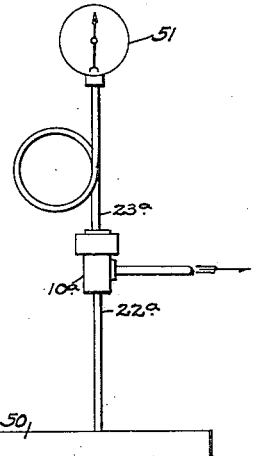
Fig. 14 shows one application of my invention.
Figure 13:
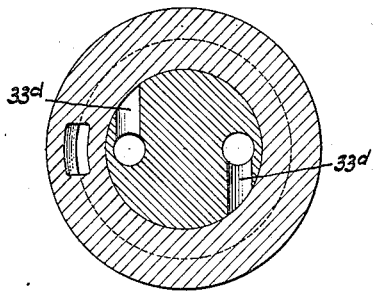
Fig. 13 is a sectional view taken along the line XIII—XIII of Fig. 12.

The form shown in Fig. 3 is particularly useful in situations requiring little, if any, flow. Fig. 14 shows such an application, where the high-pressure boiler 50 is connected by the primary pressure supply conduit or passage 22a to the transformer, the latter having its secondary pressure supply passage 23a connected to the gage 51 of moderate pressure characteristics so as to give indications more sensitive than would be given by a gage designed to be operated directly by the high pressure. For a boiler pressure of 1250 pounds, a 125 pound gage may be used with a 10 to 1 ratio pressure transformer; and the same gage may be used with boilers of different pressures by providing pressure transformers of suitable ratios.

The arrangement of Fig. 6 is similar to that of Fig. 1 except that the primary and secondary piston faces 15b and 16b face in the same direction, therefore act additively, and the pressures thereon are opposed by the spring 52. Assuming that the piston 12b is in equilibrium position, an increase in primary pressure results in downward movement of the piston which is resisted by increasing spring force. Also the secondary pressure chamber 18b is placed in communication with the exhaust channel 26b, resulting in reduction in secondary pressure; and the secondary pressure continues to reduce until the sum of the primary and secondary pressure forces acting on the piston member are in equilibrium with the spring force acting thereon, at which time the piston will be in neutral or cut-off position, as shown. If the primary pressure decreases, the secondary pressure increases until the forces thereof acting on the piston member are in equilibrium with the spring force. In other words, with this form, a change in primary pressure results in an inverse change in secondary pressure so as to balance the spring, the pressure changes being inversely proportional to the primary and secondary piston face or pressure abutment areas 15b and 16b.

To minimize resistance of the piston member 12b being turned by the reaction jets 33b, a thrust bearing 53 is arranged between the spring 52 and the piston member, the thrust bearing abutting the lower end of the piston member and being carried by a support 54 having a pivot 55 engaging the spring abutment 56.

Figure 9:
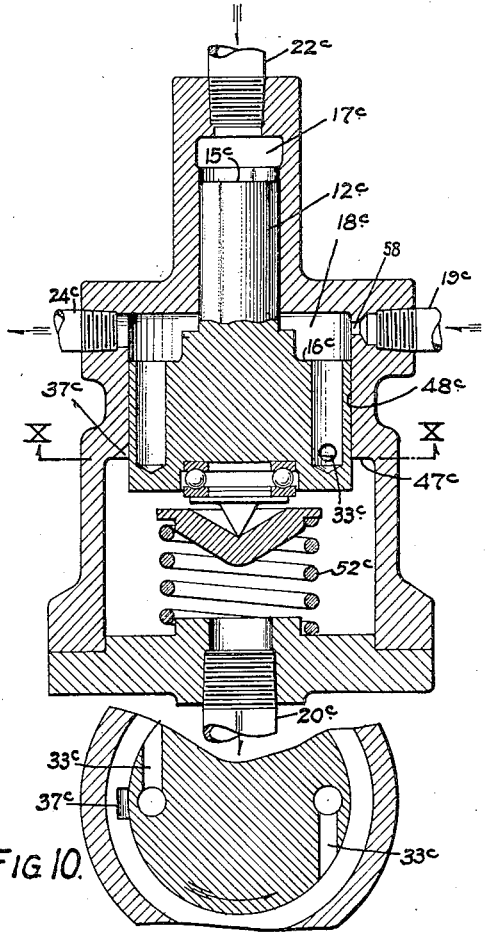
Fig. 9 is a sectional view of a fourth embodiment similar to the third except that large primary pressure changes are accompanied by small secondary pressure changes.
Figure 7:
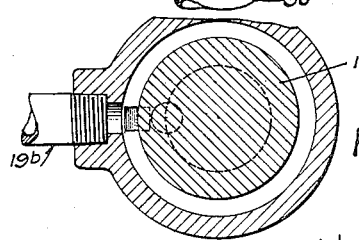
Fig. 7 is a sectional view taken along the line VII—VII of Fig. 6 and showing the piston in plan.
Figure 8:
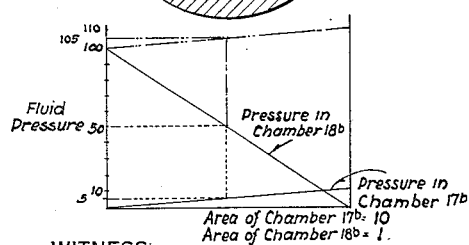
Fig. 8 is a pressure diagram for the form shown in Fig. 6.
Figure 11:
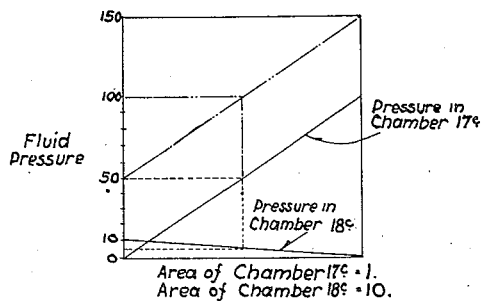
Fig. 11 is a pressure diagram for the form shown in Fig. 9.

In Fig. 9, I show another form where the primary and secondary pressure forces act together against the force of a spring but where the primary piston face 15c is smaller than the secondary piston face 16c with the result that a change in primary pressure is accompanied by a smaller but inverse change in secondary pressure. Primary pressure is supplied to the primary pressure chamber 17c by the passage 22c; pressure medium is supplied to the secondary pressure chamber 18c from the supply passage 19c through the orifice 58 and exhaust takes place from the secondary chamber through the reaction jets 33c, which are covered more or less by the lower edge 47c of the piston bore 48c; and the spring 52c cooperates with the piston member 12c, as in Fig. 6. Fig. 11 shows the pressure relations for this form; and, from this view, it will be seen that a change in primary pressure results in a smaller but inverse change in secondary pressure.

The lower edge 47c is intersected by a notch or notches 37c to increase communication of the secondary chamber 18c with the exhaust 20c when the jets pass over the notch or notches, thereby producing pressure pulsations in the secondary chamber for the purposes already pointed out in connection with Fig. 1.

The embodiment shown in Fig. 9, like that of Fig. 3, is particularly useful where little, if any, flow takes place in the apparatus supplied by the secondary passage 24c.

Figure 12:
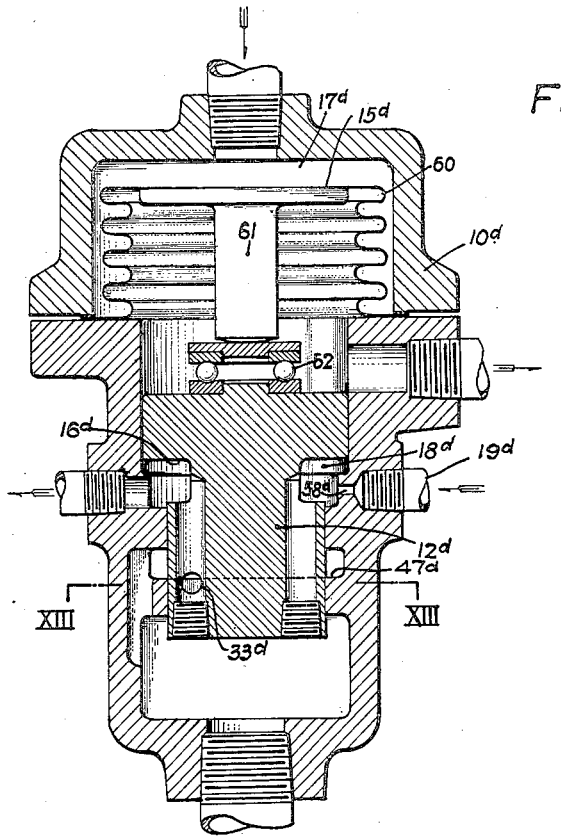
Fig. 12 is a sectional view of a fifth embodiment.

In Fig. 12, I show an embodiment where the primary pressure chamber 17d is fluid-tight and therefore particularly suitable for gaseous primary fluids. The primary piston or abutment face 15d is provided by the bellows 60 connected to the housing 10d and having a stem 61 abutting the thrust bearing 62 carried by the upper end of the piston element 12d, which defines with the housing the secondary pressure chamber 18d and has the secondary piston face or pressure abutment 16d facing oppositely to the piston face 15d. Pressure medium enters the secondary pressure chamber 18d from the supply passage 19d through the orifice 58d. As in Figs. 3 and 9, the magnitude of the secondary pressure depends upon the escape area provided by the reaction jets 33d, the outlets of the latter being covered more or less by the housing covering portion or edge 47d; however, as the secondary pressure acting on the face 16d must oppose or balance the primary pressure acting on the face 15d, the covering portion or edge 47d is so disposed as to restrict the outlet area of the reaction jets so as to build up the secondary pressure in consequence of downward movement of the piston construction on account of increase in primary pressure. On the other hand, with a decrease in primary pressure, the piston construction moves up due to the secondary pressure until the latter is lowered sufficiently to restore balance of the pressure forces acting on the piston construction. The primary and secondary pressure changes necessary to maintain equilibrium vary, of course, inversely with the piston areas since the product of the primary pressure times the area of the face 15d must equal the secondary pressure times the effective area of the piston face 16d to produce a balanced condition.

The expression "piston construction" as used herein is intended to cover any piston device capable of achieving the purposes of the present invention, that is, a single piston element as shown in all views except Fig. 12 as well as the piston and bellows elements of the latter view.

From the foregoing, it will be apparent that I have devised a pressure transformer susceptible of a variety of applications. The primary and secondary pressures may go up and down together and in ratio dependent upon the piston areas or the pressure changes may be inversely related; and, with either type, small changes in primary pressure may accompany large changes in secondary pressure or vice versa. Where the secondary displacement requirements are large or where there is leakage, it is advisable to provide a source of pressure medium for the secondary pressure chamber separate from the primary pressure. On the other hand, where the secondary supply passage is in effect closed, as when used with a gage, the source of primary pressure medium may be depended upon to provide the secondary pressure. If the primary pressure medium is a gas, or if it is desired to have a fluid-tight primary chamber, then the bellows or sylphon form may be preferable. Spinning motion is preferably imparted to the piston construction to avoid static friction, and the spinning motion is preferably accompanied by secondary pressure pulsations, the latter being due to periodic notch registrations effected by the spinning motion. These periodic secondary pressure pulsations not only assist in avoiding static friction in the transformer but avoid static friction of elements movable in response to secondary pressure changes, the movable elements subject to the secondary pressure having small reciprocatory movements imparted thereto due to the pulsations.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus of the character described, a housing, a piston construction in the housing and defining with the latter a pressure chamber, means for supplying fluid under pressure to the pressure chamber, means responsive to axial adjustment of the piston construction for varying the pressure in said pressure chamber, means for supplying fluid under chamber pressure from the pressure chamber, and turbine means provided on the piston construction for turning it, whereby static friction is avoided and axial movement of the piston construction is facilitated.

2. The combination as claimed in claim 1 with means provided on the housing and on the piston construction and responsive to turning of the latter to effect pressure pulsations in the pressure chamber and the supply means.

3. The combination as claimed in claim 1 wherein the means for turning the piston construction embodies reaction jets carried by the latter and supplied with pressure medium from the pressure chamber.

4. In pressure transformation apparatus, a housing, an abutment element movable in the housing and having pressure areas or faces defining with respect to the latter primary and secondary pressure chambers, means for supplying primary pressure medium to the primary chamber, means for supplying pressure medium to the secondary chamber, means responsive to movement of the abutment element for controlling the exhaust of pressure medium from the secondary chamber, the primary and secondary pressure areas of the abutment element having such relation that movement of the abutment element in response to primary pressure change is opposed by secondary pressure change, and means provided on the abutment element and utilizing pressure medium supplied from the secondary chamber for producing movement of the abutment element to avoid static friction.

5. In pressure transformation apparatus, a housing having an exhaust connection, a piston construction in the housing having opposed pressure abutment faces defining with the housing primary and secondary chambers and having a valve portion controlling communication between the secondary chamber and the exhaust connection, a passage for supplying medium under primary pressure to the primary chamber, a passage for supplying medium under secondary pressure from the secondary chamber to a desired point of use, means for supplying pressure medium to the secondary chamber, and means for spinning the piston construction to avoid static friction and thereby to facilitate pressure responsive movement thereof.

6. The combination as claimed in claim 5 with means responsive to spinning of the piston construction for producing periodic pressure pulsations in the secondary chamber and in the pressure supply passage.

7. The combination as claimed in claim 5 wherein the spinning means embodies reaction jets carried by the piston construction and utilizing pressure medium under secondary pressure for turning the piston construction and means responsive to turning of the piston construction for producing periodic pressure pulsations in the secondary chamber and in the supply passage communicating therewith.

8. In pressure transformation apparatus, a housing having an exhaust passage, a piston member in the housing and having piston faces defining with the latter primary and secondary chambers, means for supplying medium under primary pressure to the primary chamber, means for supplying pressure medium to the secondary chamber, reaction jet means carried by the piston member and utilizing pressure medium supplied from the secondary pressure chamber for turning the piston member and discharging to the exhaust passage, means provided interiorly of the housing for closing more or less the jet outlets dependent upon the axial position of the piston member, and means for supplying medium under secondary pressure from the secondary chamber to a desired point of use.

9. In pressure transformation apparatus, a housing, a piston member in the housing and having piston faces facing in like directions and defining with the housing primary and secondary pressure chambers, pressure means acting on the piston member in opposition to pressure applied to the piston faces, pressure supply and exhaust passages for the secondary chamber, means provided on the piston member and responsive to axial movement of the latter for controlling communication between the secondary chamber and the exhaust passage, means for supplying medium under primary pressure to the primary chamber, means for supplying medium under secondary pressure from the secondary chamber to a desired point of use, and means for spinning the piston member to avoid static friction.

10. The combination as claimed in claim 9 with means provided on the piston member for spinning the latter to avoid static friction and a thrust bearing between the piston member and the pressure means acting in opposition to pressures applied to the piston faces.

11. In pressure transformation apparatus, a housing having a cylindrical bore, a piston construction in the housing and having primary and secondary pressure abutment faces defining with the latter primary and secondary pressure chambers, the piston construction having a piston portion fitting said cylindrical bore and provided with said secondary abutment face, pressure supply and exhaust passages for the secondary pressure chamber, means provided on the piston construction and dependent upon the axial position of the latter for controlling communication between the secondary chamber and the exhaust passage, means for supplying medium under primary pressure to the primary chamber, and means for supplying medium under secondary pressure from the secondary chamber to a desired point of use.

12. The combination as claimed in claim 11 wherein the piston construction embodies a bellows connected to the housing to provide the primary pressure chamber and the primary pressure abutment face.

13. The combination as claimed in claim 11 wherein the supply passage for the secondary chamber is a passage provided in the piston construction, communicating with the primary and secondary chambers, and having an orifice.

14. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation to the primary pressure is dependent upon the relative areas of the abutment faces and including admission and exhaust ports for the secondary chamber, means for supplying medium under pressure to the admission port, and a piston valve element forming a part of the piston construction for controlling at least communication of the secondary chamber with one of said ports; and a passage communicating with the secondary chamber for supplying medium under secondary pressure from the latter to a desired point of use.

15. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation to the primary pressure is dependent upon the relative areas of the abutment faces and including admission and exhaust ports for the secondary chamber, means for supplying medium under pressure to the admission port, and a piston valve element forming a part of the piston construction for controlling at least communication of the secondary chamber with the exhaust port and including a passage formed therein for supplying medium from the admission port to the secondary chamber; and a passage communicating with the secondary chamber for supplying medium under secondary pressure from the latter to a desired point of use.

16. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation to the primary pressure is dependent upon the relative areas of the abutment faces and including admission and exhaust ports for the secondary chamber, means for supplying medium under pressure to the admission port, and a piston valve element forming a part of the piston construction for controlling at least communication of the secondary chamber with one of said ports; means provided on the piston construction for spinning the latter; passages embodied within the piston construction for supplying medium from the secondary chamber space to said last named means; and a passage communicating with the secondary chamber for supplying medium under secondary pressure from the latter to a desired point of use.

17. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation to the primary pressure is dependent upon the relative areas of the abutment faces including admission and exhaust ports for the secondary chamber, means for supplying medium under pressure to the admission port, and a piston valve element forming a part of the piston construction for controlling communication of the secondary chamber with the admission and exhaust ports; and a passage communicating with the secondary chamber for supplying medium under secondary pressure from the latter to a desired point of use.

18. In pressure transformation apparatus, a housing; a piston construction in the housing and having abutment faces defining with the housing primary and secondary pressure chambers; means for supplying primary pressure medium to the primary pressure chamber; means for maintaining a secondary pressure in the secondary pressure chamber whose relation to the primary pressure is dependent upon the relative areas of the abutment faces and including admission and exhaust ports for the secondary chamber, means for supplying medium under pressure to the admission port and including an orifice for restricting flow into the secondary chamber, a piston valve element forming a part of the piston construction for controlling communication of the secondary chamber with the exhaust port; and a passage communicating with the secondary chamber for supplying medium under secondary pressure from the latter to a desired point of use.

19. In pressure transformation apparatus, a housing; a piston construction in the housing and having abutment faces defining with the housing primary and secondary pressure chambers; means for supplying primary pressure medium to the primary pressure chamber; means for maintaining a secondary pressure in the secondary pressure chamber whose relation to the primary pressure is dependent upon the relative areas of the abutment faces and including admission and exhaust ports for the secondary chamber, means for supplying medium under pressure to the admission port and including an orifice for restricting flow into the secondary chamber, and a piston valve element forming a part of the piston construction for controlling communication of the secondary chamber with the exhaust port; means utilizing fluid exhausted from the secondary chamber for spinning at least the portion of the piston construction including the piston valve element; and a passage communicating with the secondary chamber for supplying medium under secondary pressure from the latter to a desired point of use.

20. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation is dependent upon the relative areas of the abutment faces and including admission and exhaust ports for the secondary chamber, means for supplying medium under pressure to the admission port, and a piston valve element forming a part of the piston construction for controlling at least communication of the secondary chamber with the exhaust port; a passage communicating with the secondary chamber for supplying medium under secondary pressure from the latter to a desired point of use; and means providing for pressure pulsations in the secondary chamber and in the secondary pressure supply passage.

21. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation is dependent upon the relative areas of the abutment faces and including admission and exhaust ports for the secondary chamber, means for supplying medium under pressure to the admission port, and a piston valve element forming a part of the piston construction for controlling at least communication of the secondary chamber with the exhaust port; a passage communicating with the secondary chamber for supplying medium under secondary pressure from the latter to a desired point of use; means for spinning the piston construction; and means responsive to spinning of the piston construction for producing intermittent pressure pulsations in the secondary chamber and in the secondary pressure supply passage.

22. In pressure transformation apparatus, a housing; a piston construction in the housing and having abutment faces defining with the housing primary and secondary pressure chambers; means for supplying primary pressure medium to the primary chamber; means for maintaining a secondary pressure in the secondary chamber whose relation to the primary pressure is dependent upon the relative areas of the abutment faces including admission and exhaust ports for the secondary chamber, means for supplying medium under pressure to the admission port, and a piston valve element forming a part of the piston construction for controlling communication of the secondary chamber with the admission and exhaust ports; a passage communicating with the secondary chamber for supplying medium under secondary pressure from the latter to a desired point of use; complemental recesses provided at one side of the supply port and in the piston valve element and which, when in registry, afford communication between the admission port and the secondary chamber; and means for spinning the piston construction to overcome static friction and to effect registration of said recesses to produce pressure pulsations in the secondary chamber and the secondary supply passage communicating therewith.

23. In a pressure-responsive device, a body member having a cylindrical bore, a freely turnable and axially movable pressure responsive piston element in the bore, and means carried by the piston element for continuously spinning the latter to avoid static friction and consequent interference to pressure-responsive movement of the piston.

24. In pressure transformation apparatus, means providing a pressure supply chamber, means for varying the pressure in said chamber including pressure admission and exhaust ports and valve means cooperating therewith, a passage communicating with the chamber for supplying medium under pressure from the latter to a desired point of use, pressure-responsive means for moving the valve means to obtain a chamber pressure dependent upon the pressure applied to the pressure-responsive means, means for rotating the valve means, and means responsive to rotation of the valve means for producing intermittent short interval pressure fluctuations in the chamber and said supply passage.

25. In pressure transformation apparatus, means providing a pressure supply chamber, means for varying the pressure in said chamber including pressure admission and exhaust ports and valve means cooperating therewith, a passage communicating with the chamber for supplying medium under pressure from the latter to a desired point of use, pressure-responsive means for moving the valve means to obtain a chamber pressure dependent upon the pressure applied to the pressure-responsive means, and means utilizing medium supplied to said pressure admission port for producing intermittent short interval pressure fluctuations in said chamber and in said passage of suitable frequency to vibrate parts to avoid static friction.

26. In pressure transformation apparatus, means providing a pressure supply chamber, means for varying the pressure in said chamber including admission and exhaust ports and a piston valve cooperating therewith, a passage communicating with the chamber for supplying medium under pressure from the latter to a desired point of use, pressure-responsive means for moving the piston valve to secure a chamber pressure dependent upon the pressure applied to the pressure-responsive means, and means carried by the piston valve for continuously spinning the latter.

27. In pressure transformation apparatus, means providing a pressure supply chamber, means for varying the pressure in said chamber including admission and exhaust ports and a piston valve cooperating therewith, a passage communicating with the chamber for supplying medium under pressure from the latter to a desired point of use, pressure-responsive means for moving the piston valve to secure a chamber pressure dependent upon the pressure applied to the pressure-responsive device, means for spinning the piston valve, and means responsive to spinning of the piston valve to produce pressure fluctuations in said chamber and the supply passage.

VICTOR I. ZELOV.